United States Patent
Fries et al.

(10) Patent No.: US 8,386,765 B2
(45) Date of Patent: Feb. 26, 2013

(54) METHOD FOR THE ENCRYPTED TRANSMISSION OF SYNCHRONIZATION MESSAGES

(75) Inventors: Steffen Fries, Baldham (DE); Jean Georgiades, München (DE); Stephan Schüler, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 1001 days.

(21) Appl. No.: 11/921,130

(22) PCT Filed: Mar. 24, 2006

(86) PCT No.: PCT/EP2006/061024
§ 371 (c)(1),
(2), (4) Date: Apr. 1, 2009

(87) PCT Pub. No.: WO2006/128748
PCT Pub. Date: Dec. 7, 2006

(65) Prior Publication Data
US 2009/0204811 A1    Aug. 13, 2009

(30) Foreign Application Priority Data
May 31, 2005   (DE) .......................... 10 2005 025 328

(51) Int. Cl.
*H04L 29/06* (2006.01)
*G06F 1/12* (2006.01)

(52) U.S. Cl. ........ 713/150; 713/151; 713/154; 713/160; 713/178; 713/375; 713/400; 713/500; 713/600; 726/2; 726/3; 726/13; 726/14; 726/26; 726/30; 380/28; 380/29; 380/44; 380/46; 380/47; 370/503; 370/512; 370/515

(58) Field of Classification Search .................. 713/150, 713/160, 400
See application file for complete search history.

(56) References Cited

U.S. PATENT DOCUMENTS

| | | | | |
|---|---|---|---|---|
| 5,341,427 A | * | 8/1994 | Hardy et al. | 380/273 |
| 6,041,066 A | * | 3/2000 | Meki et al. | 370/512 |
| 7,120,792 B1 | * | 10/2006 | Jacobson et al. | 713/153 |
| 7,346,770 B2 | * | 3/2008 | Swander et al. | 713/153 |
| 2003/0167394 A1 | | 9/2003 | Suzuki et al. | |
| 2006/0251084 A1 | * | 11/2006 | Elliot | 370/398 |

FOREIGN PATENT DOCUMENTS

| EP | 1 041 823 A2 | 10/2000 |
|---|---|---|
| WO | WO 02/073848 A1 | 9/2002 |

OTHER PUBLICATIONS

Hong, May 28, 2003, Clock Synchronization in Wireless Distributed Embedded Applications, pp. 1-4.*

(Continued)

*Primary Examiner* — Edan Orgad
*Assistant Examiner* — Jenise Jackson

(57) ABSTRACT

There is described a method for transmitting synchronization messages, for example PTP messages of the IEEE 1588 standard, the PTP message being inserted into a data packet in line with the Internet Protocol, the data packet having an IP header, and the data packet having a UDP header. In this case, for the encrypted transmission on the PTP message, the data packet is addressed to a UDP port that is reserved for encrypted PTP messages, the data packet is provided with an additional S-PTP header that is provided for encryption, the PTP message is extended with a pseudo random number, and the PTP message is encrypted together with the pseudo random number.

20 Claims, 1 Drawing Sheet

OTHER PUBLICATIONS

David L Mills University of Delaware: "Network Time Protocol (Version 3), Specification, Implement and Analysis; rfc1305.txt", IETF Standard, Internet Engineering Task Force, IETF, CH, Mar. 1992, XP015007092, ISSN: 0000-0003, p. 2-p. 3, p. 61-p. 63.

IEC 61588: "IEEE 1588: precision clock synchronization protocol for networked measurement and control systems", International Standard—IEC, New York, NY, US, Nr. 61588, Sep. 2004, Page complete, XP002367391, p. 24, p. 102-p. 103, p. 148.

Postel I SI J: "Darpa Internet Program Protocol Specification Internet Control Message Protocol; rfc792 txt", IETF Standard, Internet Engineering Task Force, IETF, CH, Sep. 1981, XP015006774, ISSN: 0000-0003. p. 16-p. 17.

* cited by examiner

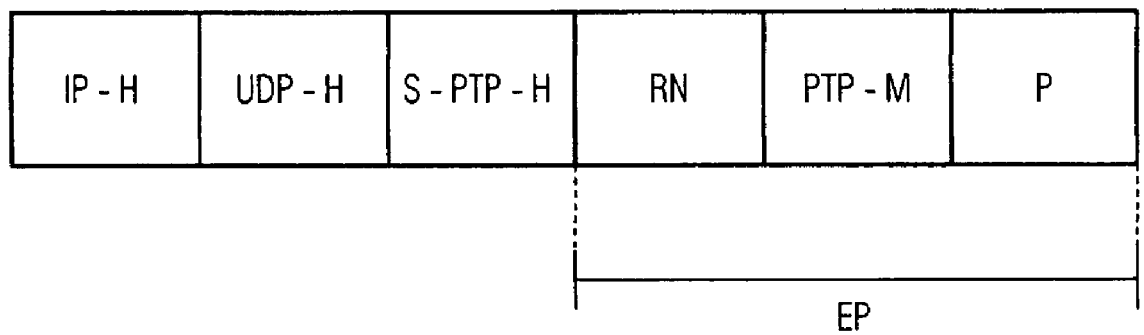

METHOD FOR THE ENCRYPTED TRANSMISSION OF SYNCHRONIZATION MESSAGES

CROSS REFERENCE TO RELATED APPLICATIONS

This application is the US National Stage of International Application No. PCT/EP2006/061024, filed Mar. 24, 2006 and claims the benefit thereof. The International Application claims the benefits of German application No. 10 2005 025 328.8 DE filed May 31, 2005, both of the applications are incorporated by reference herein in their entirety.

FIELD OF INVENTION

The invention relates to a method for transmitting synchronization messages.

BACKGROUND OF INVENTION

In distributed communication or data processing systems, great demands are placed on the time synchronism of their components. The clock generators in these components are frequently synchronized to one another by interchanging data packets provided with timestamps via an asynchronous network or to a reference timer which can be reached via the asynchronous network.

The protocol currently used for clock and phase synchronization of clock generators via asynchronous networks is what is known as the PTP protocol (PTP: Precision Time Protocol), which is defined in the IEEE-1588 standard (IEEE: "Institute of Electrical and Electronic Engineers"). In this context, PTP messages are interchanged via the asynchronous network, for example using data packets which comply with the Internet Protocol.

PTP messages have to date been used primarily in networks and network segments which are small in size both geographically and logically. However, new techniques, particularly in the case of active network elements (switches, routers etc.), make it possible to use PTP messages in larger networks with a large number of "subscribers", that is to say network elements, too. A drawback found in this context, however, is that PTP messages can be "monitored". For example, known tools are what are known as "sniffers" which can be used to spy out all the data traffic in a network or network segment. Abusive analysis carried out in this regard on the registered (monitored) PTP messages can be used to infer the function and mode of operation of other network elements, which can be a problem for data integrity. It is also possible to "corrupt" PTP messages and hence disrupt the operation of other network elements. Finally, "genuine" PTP messages can also be recorded and repeatedly introduced into the network or network segment abusively, which likewise disrupts the operation of other network elements. The latter abusive processes are also known as "Denial-of-Service attacks").

SUMMARY OF INVENTION

It is therefore an object of the invention to increase security for the use of PTP messages.

The object is achieved by the use of a method in accordance with an independent claim.

In this case, synchronization messages, for example PTP messages based on the IEEE-1588 standard, are transmitted by inserting the PTP message into a data packet based on the Internet Protocol, the data packet having an IP header and the data packet having a UDP header. Encrypted transmission of the PTP message involves the data packet being sent to a UDP port reserved for encrypted PTP messages, the data packet is equipped with an additional S-PTP header provided for the encryption, the PTP message is extended by a pseudo random number, and the PTP message is encrypted together with the pseudo random number. Encrypting the useful content of the data packets first of all prevents the content of the data packets, that is to say the PTP messages, from being able to be read by unauthorized parties and secondly prevents corrupt PTP messages from being able to be introduced into the network and cause damage therein, because a corrupt PTP message is either not decrypted or has a meaningless content following decryption. In addition, inserting a pseudo random number first of all prevents "genuine" data packets from being abusively recorded (registered) and repeatedly sent to the receiver, because the receiver is able to check whether successive incoming synchronization messages (PTP messages) have been provided with different pseudo random numbers. Secondly, the addition of pseudo random numbers makes abusive recovery of the key used more difficult, because even in cases in which the time at which the PTP messages are sent and hence the useful content are known it is not possible to estimate the entire plain text content of the PTP messages, and hence a comparison of the estimated content with the encrypted message cannot be used for abusive recovery of the key used.

In practice, every data packet is sent using an encrypted PTP message to a port (UDP port), provided specifically for such messages, at the receiving component or components. This ensures that encrypted and unencrypted PTP messages are processed as intended in each case. An additional header transmitted with the PTP message, known as the S-PTP header, identifies the encryption method used. In this case, this S-PTP header may also contain additional statements, for example about the size of the pseudo random number used (that is to say the number of bit locations used for it).

Advantageous refinements of the inventive method are specified in the subclaims.

It has been found to be advantageous if the data block which comprises the pseudo random numbers and the PTP message and which is to be encrypted is extended by a filler pattern, the proportions of the filler pattern being such that the block to be encrypted has a predefined block size. This means that it is also possible to use encryption methods which advantageously use useful data which have a particular number of bits or bytes, for example 64 bits or a multiple thereof. In addition, filling to constant block sizes increases security further, because this complicates or prevents inference of the content of a monitored message from its length. Statements about the filling of the PTP message can advantageously be included in the S-PTP header, either by merely storing information to the effect that a filler pattern has been used or else also indicating the type or size of the filler pattern.

Symmetrical encryption methods, for example the triple data encryption standard (3DES) method, are particularly suitable. These methods have the advantage that encrypting and decrypting the useful data (PTP message) take a relatively short and at the same time constant period of time. The transmission method can therefore also be used in arrangements in which it is frequently necessary to synchronize components to one another and it is also important for the components to be synchronized quickly.

In networks, a distinction is frequently drawn between different types of PTP messages. Firstly, PTP messages with the time information ("timestamp messages") are known which are used for actually synchronizing components. Secondly, administration messages are also known which are used for the administration of PTP network ports and for configuring other PTP-related settings for the components. The method is advantageously used for all types of PTP messages, and it has been found to be advantageous to use respective different keys for the administration messages and for the timestamp messages. For example, PTP timestamp messages are often sent to a plurality of receiving components simultaneously (these are also referred to as broadcast and multicast messages), each of these receiving components needing to have the key to decrypt the timestamp messages. In many cases, however, it is desirable to assign a divergent and different key for the administration of each component requiring administration, which increases the security for particularly sensitive administration of components.

BRIEF DESCRIPTION OF THE DRAWINGS

The inventive method is explained in more detail below with reference to a sole drawing.

In the drawing, the single FIGURE shows the schematic structure of a data packet with a PTP message which is to be encrypted.

DETAILED DESCRIPTION OF INVENTION

The FIGURE shows a data packet which is to be used to transmit a synchronization message, in this case a PTP message PTP-M ("Precision Time Protocol Message"), in a data network (not shown). In this case, the data network is a network segment of an LAN (Local Area Network), for example in a production plant in which various production machines need to be synchronized to one another. Instead of the IEEE 1588 protocol considered here by way of example, it is also possible to use other synchronization messages from another protocol.

In the present exemplary embodiment, a symmetrical encryption method is assumed, i.e. it is assumed that both the sending component ("time master") and the receiving component ("time slave") have been equipped with the same key by an administrator, this key being used both for encrypting and for decrypting data.

The data packets used for transmitting the PTP message PTP-M are designed on the basis of the Internet Protocol, that is to say what are known as IP datagrams. For this reason, each data packet has what is known as an IP header IP-H, which is sufficiently well known from the prior art and is therefore not described in more detail at this juncture. PTP messages are transmitted using the IP method "UDP" (User Datagram Protocol); this is also referred to as nonsecure data transmission. Although UDP transmissions have the drawback that data packets can be lost "unnoticed", they have the advantage that the transmission proceeds quickly and easily. For the UDP transmission method, the data packet has a further header, the UDP header UDP-H. For the transmission of PTP messages which is known from the prior, art, the UDP header UDP-H is followed by the (actual) PTP message PTP-M. The text below describes how this PTP message PTP-M is transmitted in encrypted form for security reasons.

PTP messages are handled, that is to say generated, sent, received and evaluated, in the components with protocol stacks, what are known as PTP stacks. To encrypt (encipher) and decrypt (decipher) the PTP messages, the protocol stacks are extended by appropriate functions. The advantage is that application programs can access the protocol stack modified in this manner in the same way as unaltered protocol stacks.

In this context, the administration of the changed protocol stacks can take place either locally on the component (PC, machine etc.) or else using appropriately configured PTP administration messages, which are advantageously likewise encrypted by the method described below.

The PTP message PTP-M to be encrypted is first of all complemented by a pseudo random number RN. Pseudo random numbers RN are formed using generally known algorithms from various starting values, for example time information, a preceding pseudo random number RN and other values. In this example, the pseudo random number RN is placed in front of the PTP message PTP-M; it goes without saying that it is also possible to choose another arrangement. The PTP message PTP-M extended in this manner is also complemented by a number of filler bits, what is known as the filler pattern P. The proportions of this filler pattern P are made such that the PTP message PTP-M together with the pseudo random number RN and the filler pattern P has a size (block size) of 64 bits or a multiple thereof. The reason for this is that the cryptography method used 3DES (Triple-Data-EncryptionStandard) always encrypts complete blocks of size 64 bits. Other encryption methods may also require another block size, or else may even dispense with the filler pattern P. In this exemplary embodiment, the pseudo random number RN has a length of 32 bits; in this case too, other sizes are conceivable.

The data to be encrypted EN ("Encrypted Portion") thus comprise the pseudo random number RN, the PTP message PTP-M and the filler pattern P. These data to be encrypted EN now have an additional header produced for them, the S-PTP header S-PTP-H. In this case, this firstly contains an identifier for the encryption method used 3DES and a statement ("flag") indicating that a filler pattern P is being, or has been, used. Alternatively, the S-PTP header S-PTP-H may also indicate how many bits the pseudo random number RN comprises, how many bits can be attributed to the PTP message PTP-M, and how many bits belong to the filler pattern P. The more statements the S-PTP header S-PTP-H records, the more flexibly the overall encryption method can be defined. On the other hand, far too detailed statements are to the detriment of security.

The S-PTP header S-PTP-H now formed, together with the data which are now encrypted, forms the useful load for an IP/UDP datagram. Thus, a "conventional" IP header IP-H and UDP header UDP-H are placed in front of the S-PTP header S-PTP-H and the encrypted data. In this exemplary embodiment, the IP datagram is being sent to a UDP port of the receiving component which (port) is reserved specifically for encrypted PTP messages PTPM. Alternatively, it is also possible to use the UDP port reserved for unencrypted PTP messages PTP-M. In that case, the PTP stack of the receiving component needs to examine all incoming PTP messages PTP-M to determine whether or not they are encrypted, however.

Instead of the symmetrical encryption method outlined, it is also possible to use asymmetric encryption methods. Thus, by way of example, a "master key" at the receiver end, that is to say a private key, can be used to derive a plurality of keys which are used only for a single session, for example. In addition, different keys are used for PTP messages PTP-M which contain timestamps and are therefore sent regularly and in so doing are also often sent to a plurality of components (Multicast/Broadcast) than for PTP messages PTP-M which are sent to single components for administration purposes. The methods for producing and managing key material are sufficiently well known in the prior art and are therefore not explained further at this juncture.

The invention claimed is:

1. A method for transmitting synchronization messages, comprising:
    providing a synchronization message according to Precision Time Protocol (PTP);
    inserting the synchronization message into a data packet, wherein the data packet is based on an Internet Protocol, wherein the data packet has an Internet Protocol header, and
    wherein the data packet has a User Datagram Protocol header;
    sending the data packet to a User Datagram Protocol port reserved for encrypted synchronization messages for an encrypted transmission of the synchronization message;
    providing the data packet with an additional Secure Precision Time Protocol header for an encryption;
    extending the synchronization message with a pseudo random number; and
    encrypting the synchronization message together with the pseudo random number,
    wherein the synchronization messages are Precision Time Protocol timestamp messages with timestamp information, and
    wherein different keys are used for encrypting Precision Time Protocol timestamp messages and for encrypting Precision Time Protocol administration messages.

2. The method for transmitting synchronization messages as claimed in claim 1, wherein a data block comprising the pseudo random number and the synchronization message is extended by a filler pattern, and wherein proportions of the filler pattern are such that the data block reaches a predefined block size if encrypted.

3. The method for transmitting synchronization messages as claimed in claim 2, wherein the predefined block size is 64 bits or a multiple thereof.

4. The method for transmitting synchronization messages as claimed in claim 1, wherein the Secure Precision Time Protocol header comprises information about an encryption algorithm used.

5. The method for transmitting synchronization messages as claimed in claim 2, wherein the Secure Precision Time Protocol header comprises information about the used filler pattern.

6. The method for transmitting synchronization messages as claimed in claim 2, wherein the Secure Precision Time Protocol header comprises information about an encryption algorithm used.

7. The method for transmitting synchronization messages as claimed in claim 6, wherein the Secure Precision Time Protocol header comprises information about the used filler pattern.

8. The method for transmitting synchronization messages as claimed in claim 5, wherein a symmetrical encryption method is used for encryption.

9. The method for transmitting synchronization messages as claimed in claim 7, wherein a symmetrical encryption method is used for encryption.

10. The method for transmitting synchronization messages as claimed in claim 1, wherein the synchronization messages are Precision Time Protocol timestamp messages with timestamp information and Precision Time Protocol administration messages for an administration of Precision Time Protocol network ports.

11. The method for transmitting synchronization messages as claimed in claim 1, wherein the synchronization messages are Precision Time Protocol administration messages.

12. A method for transmitting synchronization messages, comprising:
    providing a synchronization message according to Precision Time Protocol (PTP);
    inserting the synchronization message into a data packet, wherein the data packet is based on an Internet Protocol, wherein the data packet has an Internet Protocol header, and
    wherein the data packet has a User Datagram Protocol header;
    sending the data packet to a User Datagram Protocol port reserved for encrypted synchronization messages for an encrypted transmission of the synchronization message;
    providing the data packet with an additional Secure Precision Time Protocol header for an encryption;
    extending the synchronization message with a pseudo random number; and
    encrypting the synchronization message together with the pseudo random number,
    wherein a propagation time measurement between a first component and a second component involves a first encrypted synchronization message sent from the first component to the second component,
    wherein a second encrypted synchronization message is sent from the second component to the first component in response, and
    wherein the total propagation time of the first and second encrypted synchronization messages are measured.

13. The method for transmitting synchronization messages as claimed in claim 2, wherein a propagation time measurement between a first component and a second component involves a first encrypted synchronization message sent from the first component to the second component,
    wherein a second encrypted synchronization message is sent from the second component to the first component in response, and
    wherein the total propagation time of the first and second encrypted synchronization messages are measured.

14. The method for transmitting synchronization messages as claimed in claim 13, wherein the first and second encrypted synchronization messages each have the same block size.

15. The method for transmitting synchronization messages as claimed in claim 14, wherein the filler patterns of the first and second synchronization messages are chosen such that the first and second encrypted synchronization messages each have the same block size.

16. The method for transmitting synchronization messages as claimed in claim 12, wherein a data block comprising the pseudo random number and the synchronization message is extended by a filler pattern, and wherein proportions of the filler pattern are such that the data block reaches a predefined block size if encrypted.

17. The method for transmitting synchronization messages as claimed in claim 16, wherein the predefined block size is 64 bits or a multiple thereof.

18. The method for transmitting synchronization messages as claimed in claim 12, wherein the Secure Precision Time Protocol header comprises information about an encryption algorithm used.

19. The method for transmitting synchronization messages as claimed in claim 16, wherein the Secure Precision Time Protocol header comprises information about the used filler pattern.

20. The method for transmitting synchronization messages as claimed in claim 16, wherein the Secure Precision Time Protocol header comprises information about an encryption algorithm used.

* * * * *